No. 656,273. Patented Aug. 21, 1900.
J. S. STEWART.
INCUBATOR.
(Application filed May 2, 1900.)

(No Model.) 2 Sheets—Sheet 1.

Witnesses
F. E. Alden
H. H. Riley

Jesse S. Stewart, Inventor
by C. A. Snow & Co.
Attorneys

THE NORRIS PETERS CO., PHOTO-LITHO., WASHINGTON, D. C.

No. 656,273. Patented Aug. 21, 1900.
J. S. STEWART.
INCUBATOR.
(Application filed May 2, 1900.)
(No Model.) 2 Sheets—Sheet 2.

UNITED STATES PATENT OFFICE.

JESSE S. STEWART, OF TYRONE, PENNSYLVANIA.

INCUBATOR.

SPECIFICATION forming part of Letters Patent No. 656,273, dated August 21, 1900.

Application filed May 2, 1900. Serial No. 15,255. (No model.)

*To all whom it may concern:*

Be it known that I, JESSE S. STEWART, a citizen of the United States, residing at Tyrone, in the county of Blair and State of Pennsylvania, have invented a new and useful Incubator, of which the following is a specification.

The invention relates to improvements in incubators.

One object of the present invention is to improve the construction of incubators and to provide a simple and comparatively-inexpensive one adapted to enable the egg chamber or compartment to be readily maintained at a uniform temperature and capable of permitting the said chamber to be adjusted to and from the source of heat, so that the eggs may be arranged close to the same in cold weather and at a more remote point in warm weather.

Another object of the invention is to insure a proper ventilation of the incubator and to enable the position of the eggs to be readily changed.

The invention consists in the construction and novel combination and arrangement of parts hereinafter fully described, illustrated in the accompanying drawings, and pointed out in the claims hereto appended.

Figure 1:
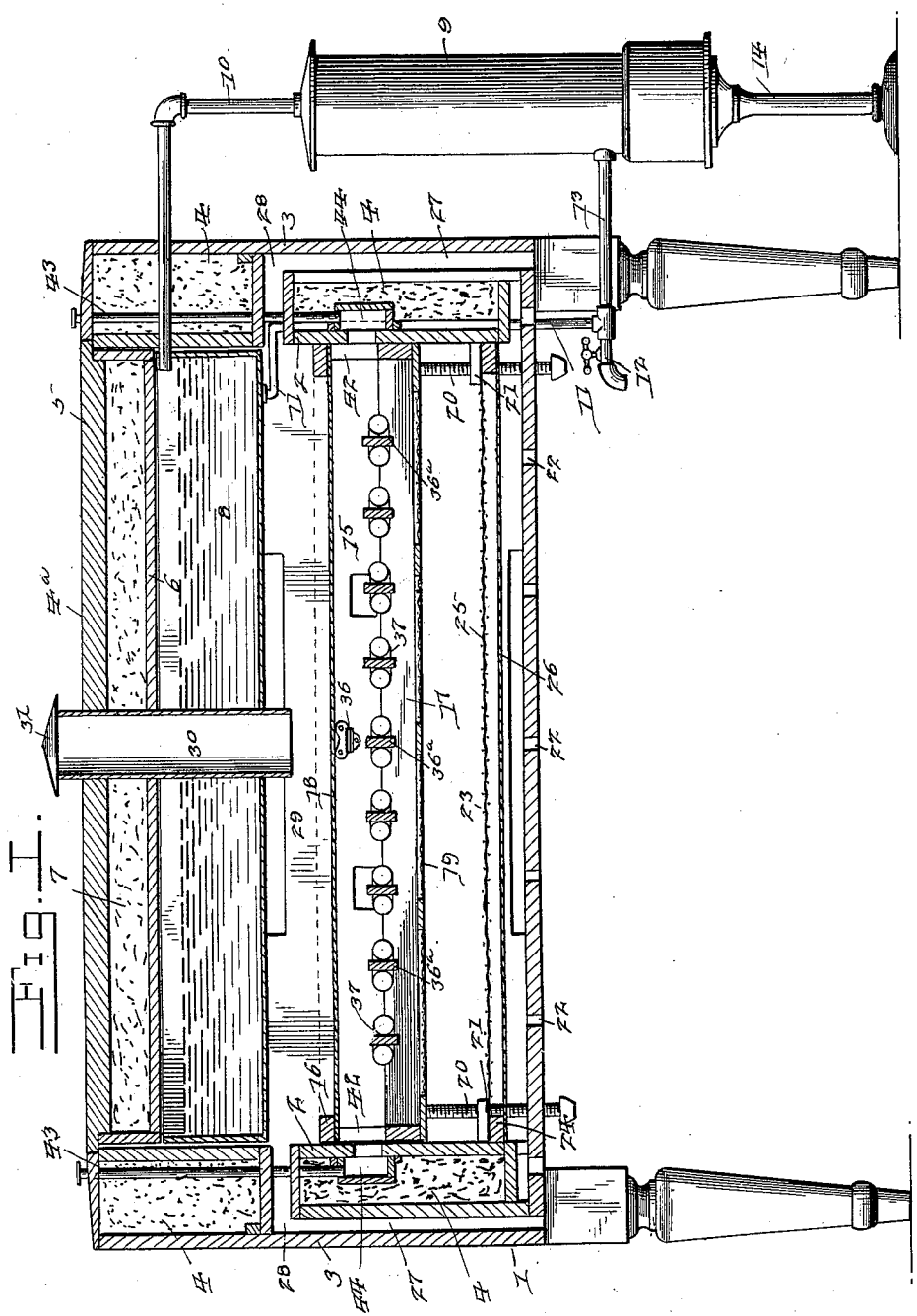
Figure 2:
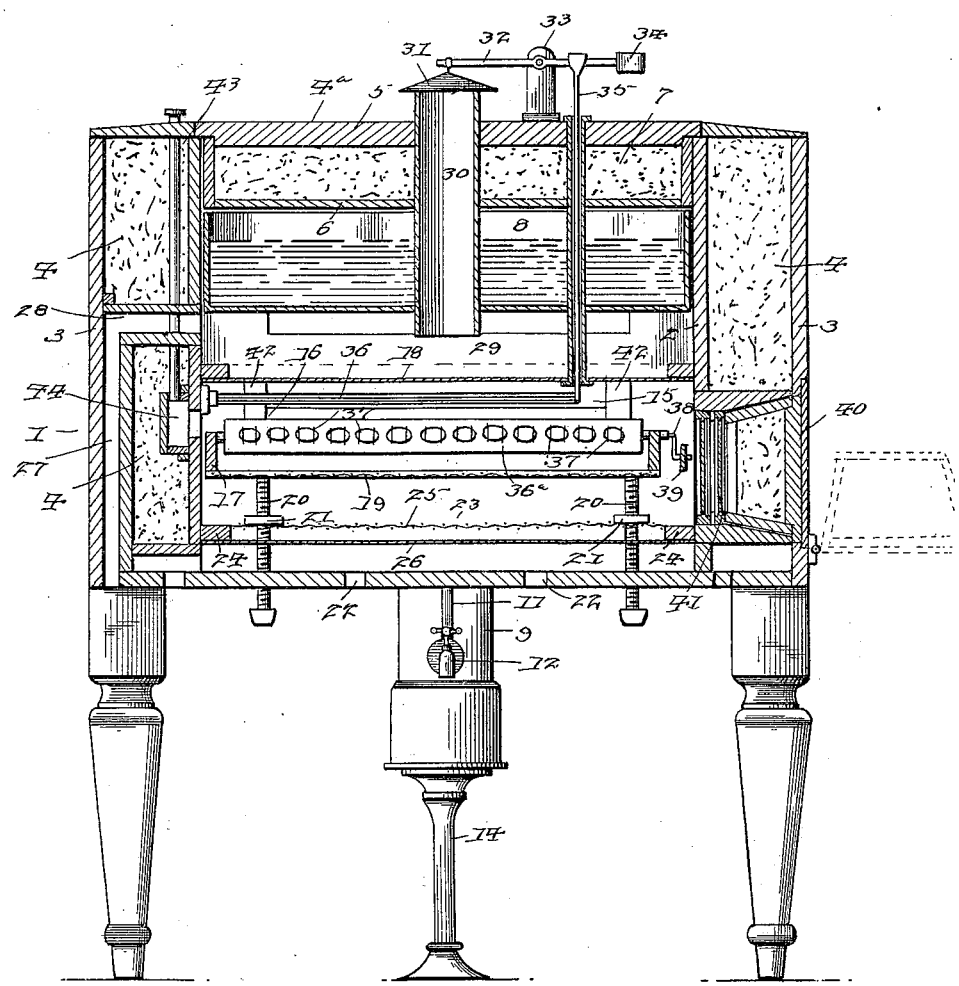

In the drawings, Figure 1 is a longitudinal sectional view of an incubator constructed in accordance with this invention. Fig. 2 is a transverse sectional view of the same.

Like numerals of reference designate corresponding parts in both figures of the drawings.

1 designates a casing provided with inner and outer walls 2 and 3, spaced apart to receive a packing of asbestos 4 or other suitable material which is a non-conductor of heat, and the said casing is provided with a lid or cover 4ª, composed of inner and outer walls 5 and 6 and provided with an interior packing 7 of asbestos or the like. A heating device 8 is arranged beneath the lid or cover 4ª, and it may consist of a tank of hot water, as illustrated in the accompanying drawings, or a hot-air or hot-water coil, or any other suitable heating device may be substituted for the tank. The hot water may be supplied to the tank from a boiler 9 through a supply-pipe 10, and it may be drawn off through a pipe 11, which is connected with the boiler and which is preferably provided with a spigot 12, so that the water may be entirely drawn off when the apparatus is not in use. The inlet-pipe 10, which extends directly from the boiler to the tank, is substantially L-shaped, and the outlet-pipe 11 extends through the lower portion of the casing to the bottom of the tank and has a horizontal arm 13, which communicates with the boiler, and by applying heat to the latter a continuous circulation of hot water may be produced. The boiler is mounted upon a suitable stand or pedestal 14, and a series of incubators may be supplied with hot water from a boiler of sufficient capacity.

The eggs are arranged within a vertically-adjustable compartment or chamber 15, consisting of upper and lower frames 16 and 17, fitted together and provided, respectively, with a top wall 18, of cloth, and a bottom wall 19, of wire-gauze or other suitable material. The side and end walls of the compartment are formed by the sides and ends of the frame 17. The compartment 15 is adjusted vertically to arrange it the desired distance from the source of heat by means of vertical screws 20, passing through threaded openings of blocks 21 and having their upper ends supporting the compartment 15 and fitting against the bottom frame. The wire-gauze bottom permits the foul air from the compartment 15 to settle to the bottom of the casing, which is provided with bottom openings 22; but in order to prevent the cold air from the exterior from affecting the eggs a partition 23 is arranged at the lower portion of the casing and is spaced from the bottom thereof. This partition consists of a rectangular frame 24 and upper and lower sheets or diaphragms 25 and 26, spaced apart and secured to the frame 24; but the said frame may consist only of end bars, and the sheets or diaphragms 25 and 26 may be stretched from one end bar to the other. The upper sheet or diaphragm is preferably constructed of wire-gauze or other suitable material, and the lower sheet consists of cloth or other fabric. The partition 23, while permitting the foul air to settle through it and pass out at the bottom of the casing, operates to exclude the cold air and will prevent the eggs from becoming chilled.

The ends of the casing are provided with vertical passages 27, having horizontal branches 28 and extending from the bottom of the casing to the space 29 between the egg chamber or compartment 15 and the hot-water tank 8 to supply fresh air to the same. When the temperature of the hot-air space or compartment 29 becomes too great, it is ventilated by means of a central vertical pipe 30 and the said passages 27. The pipe 30, which extends through the tank and the lid or cover, is provided at its upper end with a cap 31, connected with one end of a lever 32, which is fulcrumed between its ends on a support 33 and which has its other end 34 weighted to counterbalance the cap. The weighted arm of the lever is connected by a rod 35 with a thermostat 36, which when the heat in the egg compartment or chamber becomes too great is bowed and is adapted to draw the weighted arm of the lever downward and open the ventilating tube or pipe 31. The opening of the ventilating-tube causes the air in the space or compartment 29 to rise and pass out of the casing, and cool air is drawn into the incubator through the passages 27, and by this operation the temperature is reduced without changing the heating apparatus or varying the power thereof.

The lower frame 17, which forms an egg-tray, is provided at opposite sides with bearings for the reception of journals of egg-supporting bars 36, to which the eggs are secured by loops 37 of wire or other suitable material. The eggs are arranged in pairs, as clearly shown in Fig. 1, and are located at opposite sides of the bars 36, which are adapted to be rotated partially to reverse the eggs, and thereby change their positions. Each egg-supporting bar is provided at one end with a crank, which is connected with a longitudinal operating-bar 39, and the latter is adapted to be oscillated to rotate the bars one-half a revolution. The operating-bar 39 is located adjacent to a hinged section or door 40, which is adapted to be opened, as illustrated in dotted lines in Fig. 2 of the accompanying drawings, and a pair of removable sashes 41 is arranged at the inner face of the door, so that the interior of the incubator may be inspected without admitting cold air into the same. By removing the sashes 41 access may be had to operating-bar 39 and the interior of the incubator. The screws for adjusting the egg-tray extend entirely through the bottom of the incubator and are provided at their lower ends with suitable heads, and it will be clear that the egg-tray and the compartment in which the eggs are arranged may be raised and lowered to arrange them the desired distance from the tank and to bring them close to the same in cold weather and to lower them in warm weather without affecting the size of the egg compartment or chamber. The thermostat is secured to one of the side walls at a point between the upper and lower frames 16 and 17, the frames being connected by posts or supports 42, so that both frames will be raised and lowered by the adjusting-screws.

The heat from the space or compartment 29 passes through the fabric 18 of the frame 16 to the egg compartment or chamber, which is ventilated by means of vertical tubes 43, extending downward from the top of the casing to a horizontal recess or channel 44, extending along both ends and one side of the casing and communicating with the egg compartment or chamber through suitable openings, as clearly shown in Figs. 1 and 2. The egg compartment or chamber is adapted to be raised and lowered without entirely covering the openings, and it does not interfere with the ventilation.

It will be seen that the incubator is simple and comparatively inexpensive in construction; that it is adapted to maintain the egg compartment or chamber at a uniform temperature and is capable of cooling off the heating space or compartment 29 by ventilation and without changing the heating apparatus, and that the eggs may be adjusted to and from the source of heat to suit the outside temperature and to arrange them close to the hot-water tank in cold weather and some distance from the same in warm or temperate weather. It will also be apparent that the incubator is thoroughly ventilated and that foul air is permitted to escape at the bottom and that the position of the eggs may be readily changed.

What is claimed is—

1. An incubator comprising a casing, a heating device arranged at the top of the casing, a vertically-movable egg-compartment provided with means for supporting the eggs and having a top interposed between the eggs and the heating device and forming a shield, substantially as described.

2. An incubator comprising a casing provided at the top with a heating device and having an air-passage extending upward from its bottom, a ventilating tube or pipe extending through the top of the casing, means for controlling the passage of air through the ventilating tube or pipe, and an egg-tray arranged within the casing at a point below the upper end of the air-passage, substantially as described.

3. An incubator comprising a casing provided at the top with a heating device and having air-passages located at its ends and extending upward from its bottom, a ventilating tube or pipe extending through the top of the casing, means for automatically controlling the passage of air through the ventilating tube or pipe, and an egg-tray arranged within the casing at a point below the upper ends of the air-passages, substantially as described.

4. An incubator comprising a casing provided at the top with a heating device and having opposite air-passages located within its walls and extending upward from its bottom and terminating short of the heating apparatus, said casing being also provided at its bottom with openings, a vertically-movable egg compartment or receptacle provided with means for supporting the eggs, and having a top interposed between the latter and the heating device and forming a shield, and a partition interposed between the egg compartment or receptacle and the bottom of the casing, substantially as described.

5. An incubator comprising a casing provided in its walls with a horizontal channel or recess located at a point between its top and bottom, a ventilating tube or pipe extending from the channel or recess and extending to the egg-compartment, a heating device arranged at the top of the casing, and a vertically-movable egg-compartment provided with means for supporting the eggs and having a top interposed between the same and the heating device and forming a shield, substantially as described.

6. An incubator comprising a casing provided at is upper portion with a heating device, and a vertically-adjustable egg compartment or chamber composed of upper and lower frames and provided with means for supporting eggs, the upper frame being provided with a fabric top wall forming a shield and interposed between the eggs and the heating device and the lower frame having a bottom with openings, substantially as described.

7. An incubator comprising a casing provided at its bottom with openings, a heating device arranged at the upper portion of the casing, an egg compartment or chamber having a fabric top wall and provided at its bottom with openings, and a horizontal diaphragm interposed between the egg compartment or chamber and the bottom of the casing and having the fabric and woven-wire sheets spaced apart, substantially as and for the purpose described.

8. An incubator comprising a casing, a heating device arranged at the top of the casing, a vertically-movable egg compartment or receptacle composed of upper and lower frames connected together, the upper frame being provided with a top forming a shield, egg-supporting bars journaled on the bottom frame, and means for operating the egg-supporting bars, substantially as described.

In testimony that I claim the foregoing as my own I have hereto affixed my signature in the presence of two witnesses.

JESSE S. STEWART.

Witnesses:
C. O. TEMPLETON,
ALLIE WALKER.